United States Patent
McCoy (10) Patent No.: US 9,065,609 B2
(45) Date of Patent: Jun. 23, 2015

(54) BLIND MECHANISM FOR ESTIMATION AND CORRECTION OF I/Q IMPAIRMENTS

(71) Applicant: National Instruments Corporation, Austin, TX (US)

(72) Inventor: James W. McCoy, Austin, TX (US)

(73) Assignee: National Instruments Corporation, Austin, TX (US)

( * ) Notice: Subject to any disclaimer, the term of this patent is extended or adjusted under 35 U.S.C. 154(b) by 42 days.

(21) Appl. No.: 13/942,065

(22) Filed: Jul. 15, 2013

(65) Prior Publication Data

US 2015/0016571 A1 Jan. 15, 2015

(51) Int. Cl.
*H03D 1/04* (2006.01)
*H04L 1/00* (2006.01)
*H04L 25/06* (2006.01)

(52) U.S. Cl.
CPC ............ *H04L 1/0038* (2013.01); *H04L 25/067* (2013.01)

(58) Field of Classification Search
CPC .................................................. H04L 27/2647
USPC ......................................................... 375/346
See application file for complete search history.

(56) References Cited

U.S. PATENT DOCUMENTS

| | | | |
|---|---|---|---|
| 6,785,523 B2 * | 8/2004 | Husted et al. | ............... 455/219 |
| 8,385,457 B2 | 2/2013 | Laudel et al. | |
| 8,416,895 B2 | 4/2013 | Jensen et al. | |
| 2007/0058755 A1 * | 3/2007 | Husted | .......................... 375/332 |

OTHER PUBLICATIONS

H. Shafiee, H. and S. Fouladifard, "Calibration of IQ Imbalance in OFDM Receivers"; IEEE International Conference on Communications, 2003, ICC '03 (vol. 3); May 11-15, 2003; pp. 2081-2085.

* cited by examiner

*Primary Examiner* — Lihong Yu
(74) *Attorney, Agent, or Firm* — Meyertons Hood Kivlin Kowert & Goetzel, P.C.; Jeffrey C. Hood; Mark K. Brightwell (57) ABSTRACT

A mechanism for blind estimation of parameters for correcting I/Q impairments. Complex samples of a complex baseband signal are received from a receiver. A cross-correlation is computed between an I component and a Q component of the complex samples. A mean square value is computed for the I component of the complex samples; and a mean square value is computed for the Q component of the complex samples. A cross-channel gain estimate is: computed based on the cross-correlation value and one or both of the mean square values; and used to apply a cross-channel gain correction to the complex samples. An estimate of an I/Q gain imbalance is computed based on the mean square values. The gain imbalance estimate is useable to correct an I/Q gain imbalance present in the complex samples. The parameters may be supplied to the receiver, enabling the receiver to apply online corrections.

19 Claims, 8 Drawing Sheets

BLIND MECHANISM FOR ESTIMATION AND CORRECTION OF I/Q IMPAIRMENTS

FIELD OF THE INVENTION

The present invention relates to the field of telecommunication, and more specifically, to a system and method for blind estimation and correction of I/Q impairments.

DESCRIPTION OF THE RELATED ART

A transmitter may generate a complex baseband signal, e.g., by any of various digital modulation techniques such as QAM (quadrature amplitude modulation) or PSK (phase shift keying. The complex baseband signal includes an inphase (real) component and a quadrature (imaginary) component. The complex baseband signal may be upconverted to a transmission band to obtain a transmission signal. The transmission signal is transmitted onto a channel. A receiver may capture a noise-perturbed version of the transmission signal from the channel (e.g., using one or more antennas), and downconvert the captured signal to baseband. The resulting baseband signal s(t) is not identical to the original complex baseband signal at the transmitter due I/Q impairments occurring in the transmitter and receiver, e.g., gain imbalance distortions, cross-channel gain distortions and DC offset distortions. Thus, there exists a need for methods capable of estimating and correcting the I/Q impairments.

SUMMARY

In one set of embodiments, a method for blind estimation of I/Q correction parameters may involve the following operations.

The method may involve: receiving complex samples of a complex baseband signal from a receiver; computing a value of cross-correlation between an I component of the complex samples and a Q component of the complex samples; computing a mean square value IMS of the I component of the complex samples, and computing a mean square value QMS of the Q component of the complex samples; computing an estimate for a cross-channel gain k based on the cross-correlation value and one or both of the mean square values IMS and QMS; applying a cross-channel gain correction to the complex samples based on the estimate for the cross-channel gain k, in order to obtain modified complex samples; computing an estimate of a gain imbalance based on the mean square values IMS and QMS, wherein the gain imbalance estimate is useable to correct an I/Q gain imbalance present in the complex samples. The receiver may generate the complex baseband signal in response to receiving a signal transmission from a transmitter.

In some embodiments, the cross-channel gain k may represent a composite of cross-channel distortions in the transmitter and receiver, and the gain imbalance may represent a composite of gain imbalance distortions in the transmitter and receiver.

In some embodiments, the method may also include applying an I/Q gain imbalance correction to the modified complex samples based on the gain imbalance estimate to obtain corrected complex samples for the complex baseband signal.

In some embodiments, the method may also include: computing an estimate of an I-channel DC offset based on the I component of the complex samples; computing an estimate of a Q-channel DC offset based on the Q component of the complex samples; and applying DC offset corrections to the complex samples of the complex baseband signal based on the estimate of the I-channel DC offset and the Q-channel DC offset.

In some embodiments, the method may involve transferring the estimate of the cross-channel gain k and the gain imbalance estimate to the receiver, enabling the receiver to apply cross-channel gain correction and gain imbalance correction in an online operational mode of the receiver.

BRIEF DESCRIPTION OF THE DRAWINGS

A better understanding of the present invention can be obtained when the following detailed description of the preferred embodiments is considered in conjunction with the following drawings.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terminology

The following is a glossary of terms used in the present document.

Memory Medium—A memory medium is a medium configured for the storage and retrieval of information. Examples of memory media include: various kinds of semiconductor memory such as RAM and ROM; various kinds of magnetic media such as magnetic disk, tape, strip and film; various kinds of optical media such as CD-ROM and DVD-ROM;

various media based on the storage of electrical charge, magnetization state, and/or, other physical quantities; media fabricated based on controlled variation of properties such as surface height, thickness, curvature or roughness; media fabricated using various lithographic techniques; etc. The term "memory medium" also includes within its scope of meaning the possibility that a memory medium may comprise a set of two or more memory media residing at different locations, e.g., at different computers that are connected over a network.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. As used herein, the term "program" means: 1) a software program which may be stored in a memory and is executable by a processor, or, 2) a hardware configuration program useable for configuring a programmable hardware element. Any of the method embodiments described herein, or, any combination of the method embodiments described herein, or, any subset of any of the method embodiments described herein, or, any combination of such subsets may be implemented in terms of one or more programs.

Software Program—the term "software program" is intended to have the full breadth of its ordinary meaning, and includes any type of program instructions, code, script and/or data, or combinations thereof, that may be stored in a memory medium and executed by a processor. Exemplary software programs include: programs written in text-based programming languages such as C, C++, Java™, Pascal, Fortran, etc.; graphical programs (programs written in graphical programming languages); assembly language programs; programs that have been compiled to machine language; scripts; and other types of executable software. A software program may comprise two or more subprograms that interoperate in some manner.

Hardware Configuration Program—a program, e.g., a netlist or bit file, that can be used to program or configure a programmable hardware element.

Computer System—any device (or combination of devices) having at least one processor that is configured to execute instructions that are stored on a memory medium. Examples of a computer system include a personal computer (PC), a laptop, an Internet appliance, a mobile or handheld device, a personal digital assistant (PDA), a tablet computer, a workstation, a mainframe computer system, a television system, a grid computing system, or other device or combinations of devices.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a computer-readable memory medium may be configured so that it stores program instructions and/or data, where the program instructions, when executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a electronics card or board, an application-specific computer in a box, a server computer, a client computer, a handheld device, a tablet computer, a wearable computer, etc.

In some embodiments, a set of computers distributed across a network may be configured to partition the effort of executing a computational method, e.g., any of the method embodiments described herein, or, any combination of the method embodiments described herein, or, any subset of any of the method embodiments described herein, or, any combination of such subsets.

Figure 1:
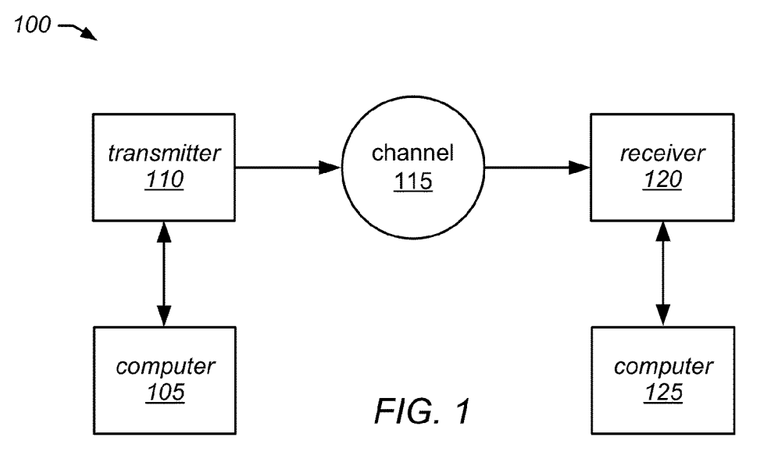
FIG. 1 illustrates one embodiment of a configuration 100 for calibrating a system including a transmitter 110 and receiver 120.

In one set of embodiments, a system 100 may include a transmitter 110 and a receiver 120. The transmitter 110 may generate and transmit a complex signal z(t) through a channel 115 to a receiver 120. The complex signal z(t) includes an inphase component I(t) and a quadrature component Q(t), where $$z(t)=(I_z(t),Q_z(t))=I_z(t)+jQ_z(t).$$

The channel 115 may be a wired channel or a wireless channel. For example, the channel 115 may be the atmosphere or free space, a portion of the earth's subsurface, a body of fluid such as an ocean, an electrical cable, a trace on an electronics board, an optical fiber, etc. The receiver 120 may receive a noise-perturbed version s(t) of the complex signal z(t) from the channel. The receiver 120 captures complex samples {S(k)} of the received complex signal s(t). Each sample has an I component and a Q component:

$$S(k)=(I_s(k),Q_s(k))=I_s(k)+jQ_s(k).$$

A computer 125 may receive the samples {S(k)} and operate on the samples to estimate correction parameters that are usable to correct the I/Q impairments of the transmitter 110 and receiver 120. Alternatively, the receiver may itself perform the estimation of the correction parameters. The computational method for estimating the correction parameters will be described below.

In some embodiments, the estimation of the correction parameters may be performed during an offline estimation mode, i.e., not during the online operational mode of the receiver. In other embodiments, the estimation of the correction parameters is performed during the online operational mode, e.g., while the receiver 120 is being used to conduct a phone conversation and/or to access data from a network via the transmitter and channel.

After having estimated the correction parameters, the correction parameters may be used to correct the I/Q impairments present in the complex samples {S(k)} during an online operational mode of the receiver 120. In some embodiments, the receiver 120 may include circuitry to apply the I/Q impairment correction to the received complex signal s(t). For example, the receiver 120 may include a programmable hardware element such as an FPGA which may be programmed to implement the correction. The computer 125 may transfer the correction parameters to the correction circuitry (e.g., to memory within the correction circuitry) of the receiver in order to put the correction into effect.

In some embodiments, the transmitter 110 may generate the complex baseband signal z(t) by converting a complex sample sequence {z(k)} to analog form using digital-to-analog conversion circuitry. Each sample z(k) of the complex sequence {z(k)} includes an inphase component and a quadrature component:

$$z(k)=(I_z(k),Q_z(k))=I_z(k)+jQ_z(k).$$

The complex sequence {z(k)} may be supplied by computer 105. In some embodiments, the complex signal {z(k)} is a QAM signal or a PSK signal.

In some embodiments, the transmitter 110 and the receiver 120 may be modular instruments configured for the prototyping of wireless links, e.g., wireless links operating in the millimeter wave band. The computer 105 and the computer 125 may also be modular instruments. (A modular instrument is a device that is configured for insertion into a chassis. The chassis includes a communication backplane allowing one or more modular instruments to communicate with each other and/or with devices external to the chassis. For example, the chassis may be a PXI chassis or a PXI Express chassis.) The transmitter and receiver may be configured to operate under the control of software executing on the computer 105 and/or the computer 125. In one embodiment, the transmitter 110 may be inserted in a first chassis and the receiver 120 may be inserted in a second chassis. In one embodiment, the computer 105 may be inserted in the first chassis, and the computer 125 may be inserted in the second chassis.

Figure 2:
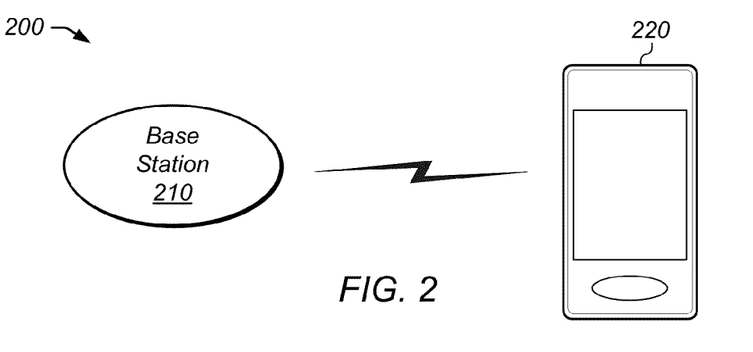
FIG. 2 illustrates a configuration 200, where the transmitter 110 is realized by a base station 210, and receiver 120 is realized by a mobile device 220.

In some embodiments, the transmitter 110 may be incorporated in a base station 210, and the receiver 120 may be incorporated in a mobile device 220 such as a wireless phone or media player or personal digital assistant, e.g., as illustrated by configuration 200 in FIG. 2.

Figure 3:
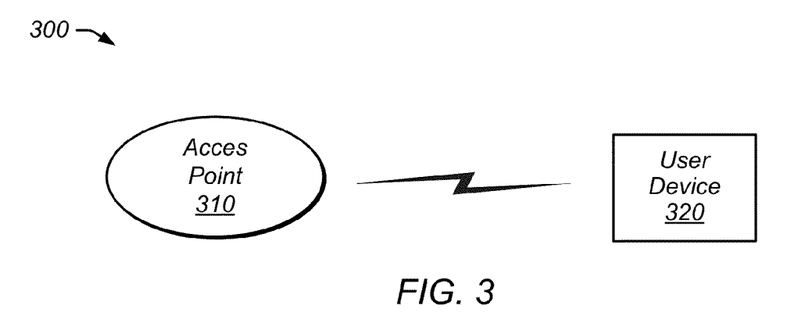
FIG. 3 illustrates a configuration 300, where the transmitter 110 is realized by an access point 310, and receiver 120 is realized by a user device 320.

In some embodiments, the transmitter 110 may be incorporated in a wireless access point 310, and the receiver 120 may be incorporated in a user device 320, e.g., as illustrated by configuration 300 in FIG. 3. The user device 320 may communicate wirelessly with the access point 320 in order to access a network, e.g., the Internet and/or a local area network. The user device 320 may be, e.g., a personal computer, a video-game console, a smartphone, a digital camera, a tablet or a digital media player. In one embodiment, the access point is an IEEE 802.11 (WiFi) access point.

In some embodiments, the transmitter 110 may transmit the complex signal z(t) by upconverting the complex signal z(t) from baseband to a transmission band. In these embodiments, the receiver is equipped with corresponding downconversion circuitry, to recover an estimate of the complex signal z(t). The upconversion allows the signal to efficiently propagate through the transmission channel. The upconversion and downconversion may be performed according to any of a wide variety of known techniques. For example, in a direct conversion architecture, the transmitter may generate a transmit signal $z_{UC}(t)$ according to the expression:

$$z_{UC}(t)=I_z(t)\cos(\omega_c t)+Q_z(t)\sin(\omega_c t),$$

where $\omega_C$ is a carrier frequency.

Figure 4:
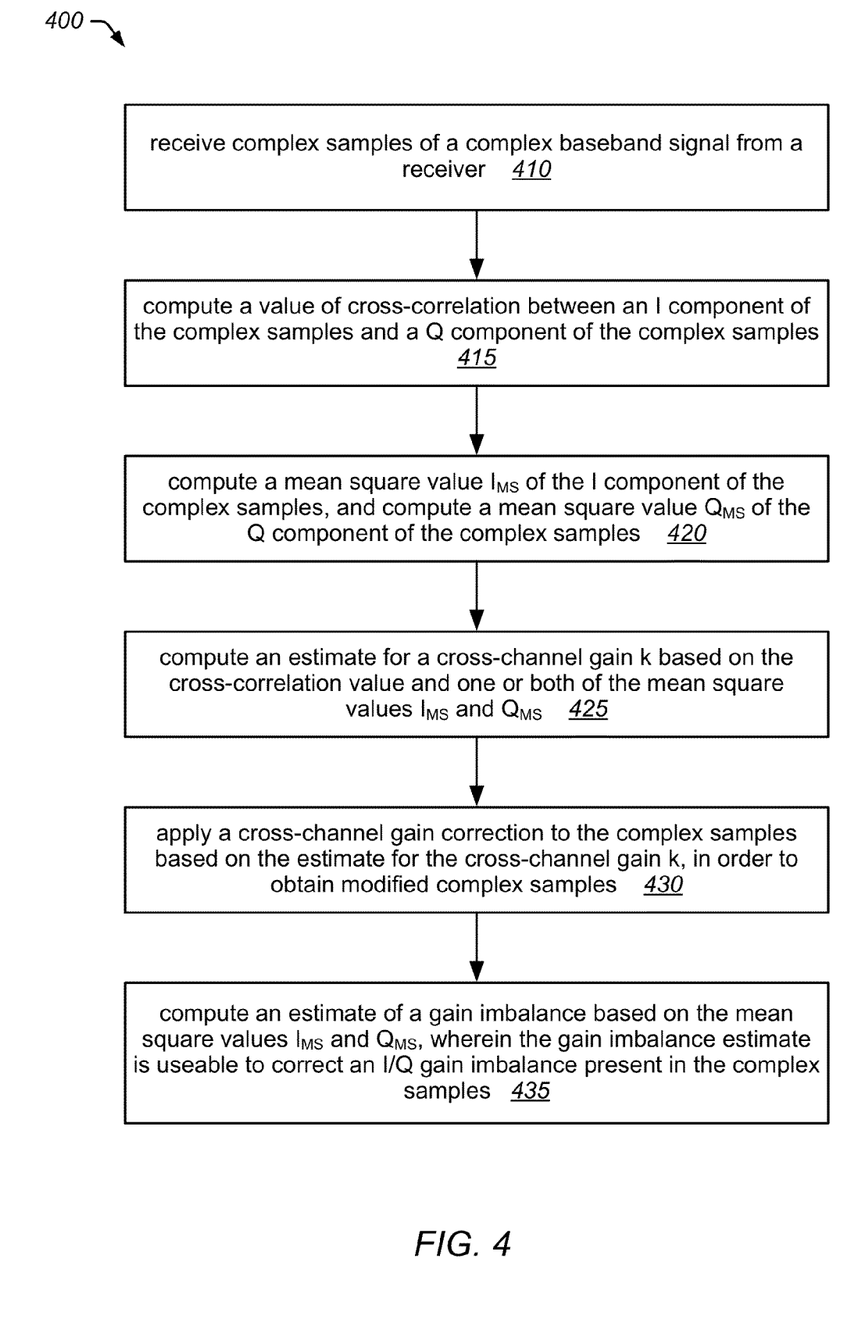
FIG. 4 illustrates one embodiment of a method for computing parameters usable to correct I/Q distortions in a system comprising a transmitter and receiver.

In one set of embodiments, a method 400 for blind estimation of receiver correction parameters may include the operations shown in FIG. 4. (The method 400 may also include any subset of the features, elements and embodiments described above in connection with FIGS. 1-3 and described below in connection with FIGS. 5-10. The modifier "blind" in the term "blind estimation" is meant to express the idea that the receiver estimates the correction parameters without prior knowledge of information impressed by the transmitter on the transmitted signal.) The method 400 may performed by one or more computers in response to the execution of stored program instructions, by one or more programmable hardware elements such as FPGAs, by dedicated digital circuitry such as one or more ASICs, or by any combination of the foregoing.

At 410, the method may receive complex samples {S(k)} of a complex baseband signal S(t) from a receiver. The receiver includes analog-to-digital conversion circuitry configured to convert the complex baseband signal S(t) into the sample sequence {S(k)}. As noted above, each sample S(k) has I and Q components:

$$S(k)=<I_s(k),Q_s(k)>.$$

The receiver may be a wireless receiver or a wired receiver. The receiver may include an RF front end that generates the complex baseband signal S(t) by downconverting a received RF signal.

At 415, the method may compute a value of cross-correlation between an I component of the complex samples and a Q component of the complex samples {S(k)}, e.g., by averaging products of the form $I_s(k)Q_s(k)$ over the time index k, e.g., according to the expression:

$$\mathrm{CrossCorr}=(I_s(1)Q_s(1)+I_s(2)Q_s(2)+\ldots+I_s(N)Q_s(N))/N,$$

where N is the number of products included in the average, or equivalently, the size of the window of complex samples {S(k)} used for estimating the correction parameters.

At 420, the method may compute a mean square value $I_{MS}$ of the I component of the complex samples {S(k)}, and compute a mean square value $Q_{MS}$ of the Q component of the complex samples {S(k)}.

At 425, the method may compute an estimate for a cross-channel gain k based on the cross-correlation value and one or both of the mean square values $I_{MS}$ and $Q_{MS}$. For example, in one embodiment, the cross-channel gain estimate may be computed according to the expression $$k\mathrm{EST}=\mathrm{CrossCorr}/I_{MS}.$$

At 430, the method may apply a cross-channel gain correction to the complex samples {S(k)} based on the estimate for the cross-channel gain k, in order to obtain modified complex samples {$S_M(k)$}, e.g., according to the expressions:

$$I_M(k)=I_s(k),$$

$$Q_M(k)=I_M(k)-k\mathrm{EST},$$

where $S_M(k)=<I_M(k),Q_M(k)>$.

At 435, the method may compute an estimate of a gain imbalance based on the mean square values $I_{MS}$ and $Q_{MS}$, where the gain imbalance estimate is useable to correct an I/Q gain imbalance present in the complex samples {S(k)} or in the modified samples {$S_M(k)$}. In one embodiment, the gain imbalance estimate GIE may be computed according to the formula $$\mathrm{GIE}=\mathrm{Sqrt}(Q_{MS})/\mathrm{Sqrt}(I_{MS}),$$

where Sqrt( ) denote the square root function.

In some embodiments, the receiver generates the complex baseband signal in response to receiving a signal transmission from a transmitter. The signal transmission from the transmitter may be a transmission of one or more of the following: a modulated waveform; a tone; a series of tones; a noise signal; and an interfering signal.

In some embodiments, the cross-channel gain k represents cross-channel distortions in the transmitter and receiver, and the gain imbalance represents gain imbalance distortions in the transmitter and receiver.

In some embodiment, the method 400 may also include applying an I/Q gain imbalance correction to the modified complex samples $\{S_M(k)\}$ based on the gain imbalance estimate to obtain corrected complex samples $\{S_C(k)\}$ for the complex baseband signal. In one embodiment, the I/Q gain imbalance correction may be applied based on the following equations:

$$I_C(k)=I_M(k),$$

$$Q_C(k)=Q_M(k)/\text{GIE},$$

where GIE denotes the gain imbalance estimate, where $S_C(k) = <I_C(k), Q_C(k)>$.

In some embodiments, the method 400 may also include displaying the corrected complex samples $\{S_C(k)\}$, e.g., in a constellation diagram.

In some embodiments, the method 400 may also include: computing an estimate of an I-channel DC offset based on the I component of the complex samples; computing an estimate of a Q-channel DC offset based on the Q component of the complex samples; and applying DC offset corrections to the complex samples $\{S(k)\}$ based on the estimate of the I-channel DC offset and the Q-channel DC offset. The I-channel DC offset and the Q-channel DC offset may be computed by respectively averaging the inphase samples $\{I_S(k)\}$ and the quadrature sample $\{Q_S(k)\}$:

$$I_{DCO}=(I_S(1)+I_S(2)+\ldots+I_S(N))/N,$$

$$Q_{DCO}=(Q_S(1)+Q_S(2)+\ldots+Q_S(N))/N.$$

As noted above, in some embodiments, the receiver generates the complex baseband signal S(t) in response to receiving a signal transmission from a transmitter. In these embodiments, the I-channel DC offset represents DC offset distortions in the I channel of the transmitter and the I channel of the receiver, and the Q-channel DC offset represents DC offset distortions in the Q channel of the transmitter and the Q channel of the receiver.

In some embodiments, the action of applying the DC offset corrections to the complex samples $\{S(k)\}$ may be performed prior to performing operations 415 through 435.

In some embodiments, the operations 410 through 435 may be performed by a computer external to the receiver. The estimate for the cross-channel gain k and the gain imbalance value may be stored in a memory of the computer.

In some embodiments, the method 400 may also include transferring the estimate of the cross-channel gain k and the gain imbalance estimate from the memory of the computer to the receiver, enabling the receiver to apply cross-channel gain correction and gain imbalance correction in an online operational mode of the receiver.

In some embodiments, the receiver may includes a programmable hardware element (or a dedicated digital circuitry) configured to apply the cross-channel gain correction and the gain imbalance correction based respectively on the estimate of the cross-channel gain and the gain imbalance estimate.

In some embodiments, the method 400 may also include: supplying complex samples $\{Z(k)\}$ of a complex input signal to the transmitter (e.g., to a sample memory within the transmitter); and directing the transmitter to perform the signal transmission based on the complex samples $\{Z(k)\}$. The transmitter may include digital-to-analog conversion circuitry to convert the complex samples $\{Z(k)\}$ into a complex baseband signal z(t). The transmitter may further include transmission circuitry configured to transmit the complex baseband signal z(t) through a transmission channel to the receiver.

In some embodiments, the complex input signal may be a digitally-modulated baseband signal such as an QAM or M-PSK signal, where M is an integer greater than or equal to two.

In some embodiments, the operations 410 through 435 may be performed by the receiver, e.g., using one or more of an on-board processor, a programmable hardware element, and an ASIC.

As noted above, the receiver may generate the complex baseband signal in response to receiving a signal transmission from a transmitter. In some embodiments, the transmitter may be a base station of a wireless communication network, and the signal transmission from the transmitter is a communication signal transmitted by the base station. The base station may be a base station of a wireless communication network.

In some embodiments, the receiver may be incorporated in a wireless communication device such as a mobile phone, a media player, a Bluetooth device, a WiFi device, a radio, etc.

IQ Imbalance Correction

IQ imbalance is a result of differing gains between the I and Q paths of a receiver and transmitter. The consequence of these differing gains is that the transmitter-receiver system creates and observes images that can be destructive to the RF measurement and link performance. In order to combat these effects, digital algorithms can be inserted between the RF front end and baseband signal processing of the receiver. Because of differing dynamic range requirements, there is a need for distinct algorithms for calibration in an online wireless mobile scenario and the offline measurement scenario. In fact, the requirements even differ for different architectures. Two algorithms are presented below for calibrating radio equipment.

The first algorithm is for an online scenario where the input is provided over-the-air. In this situation, it can be assumed that there are no images present at the input to the receiver. There are two possible approaches to the calibration. One would be standard dependent, meaning that the approach would be supervised by a reference signal utilizing a coherent approach. The second approach is standard independent, utilizing a non-coherent or blind approach to the calibration.

The second algorithm is for the offline scenario where the input comprises tones sourced from the local oscillator (LO) and other calibration signals from the transmitter. Again, there are multiple possible approaches to the calibration. In one approach, tones are sourced from the transmitter and the LO. It is possible in this approach to provide a closed-form solution to the calibration problem using a log detector.

Online Receiver Calibration

Figure 5:
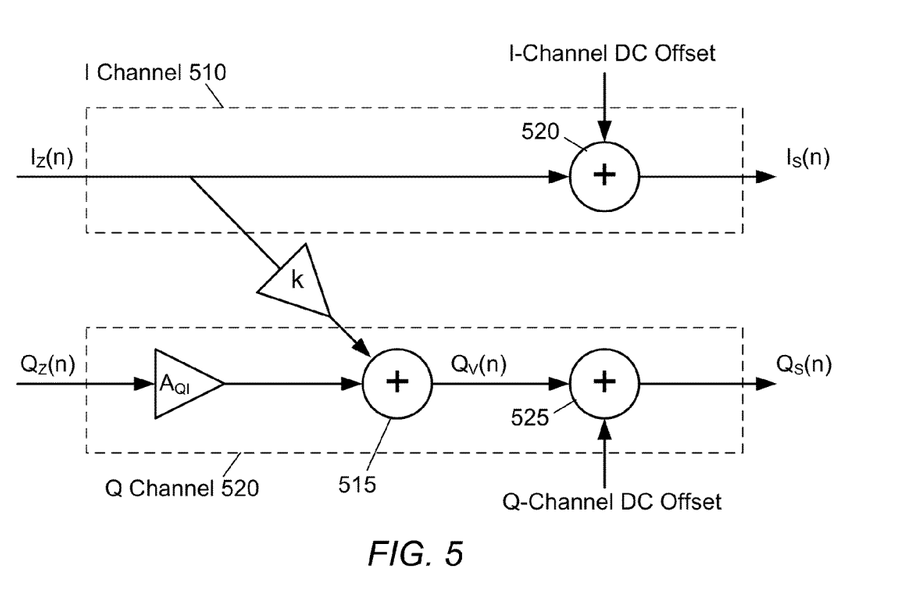
FIG. 5 illustrates one embodiment of a model for the I/Q impairments introduced by a system comprising a transmitter and a receiver.

In some embodiments, the online calibration may rely on correlation factors between the received signals $I_S(n)$ and $Q_S(n)$. This may be used to calibrate the I and Q gain offset and skew as well as the DC offset at the receiver. A model of the IQ impairments introduced by the transmitter and the receiver is presented in FIG. 5. The signals $I_Z(n)$ and $Q_Z(n)$ may represent the complex baseband signal z(n) presented to the digital-to-analog circuitry (not shown) within the transmitter. The gain $A_{QI}$ represents the gain imbalance between the I channel 510 and the Q channel 520. The gain k represents a cross-channel distortion from the I channel to the Q channel. (While the gain imbalance is modeled by a gain in the Q channel, it could equally well be modeled by a gain in the I channel. Similarly, while the cross-channel distortion is modeled as a gain from the I channel to the Q channel, it could equally well be modeled by a gain from the Q channel to the I channel.) The summing node 515 represents the addition of the output of the cross-channel gain k and the output of the gain $A_{QI}$:

$$Q_V(n) = A_{QI} * Q_Z(n) + k * I_Z(n).$$

The addition is represented by summing node 515. Furthermore, summing nodes 520 and 525 represent the DC offset distortions in the I channel and Q channel respectively:

$$I_S(n) = I_Z(n) + (\text{I-Channel DC Offset}),$$

$$Q_S(n) = Q_V(n) + (\text{Q-Channel DC Offset}).$$

Impairment Correction Model

Figure 6:
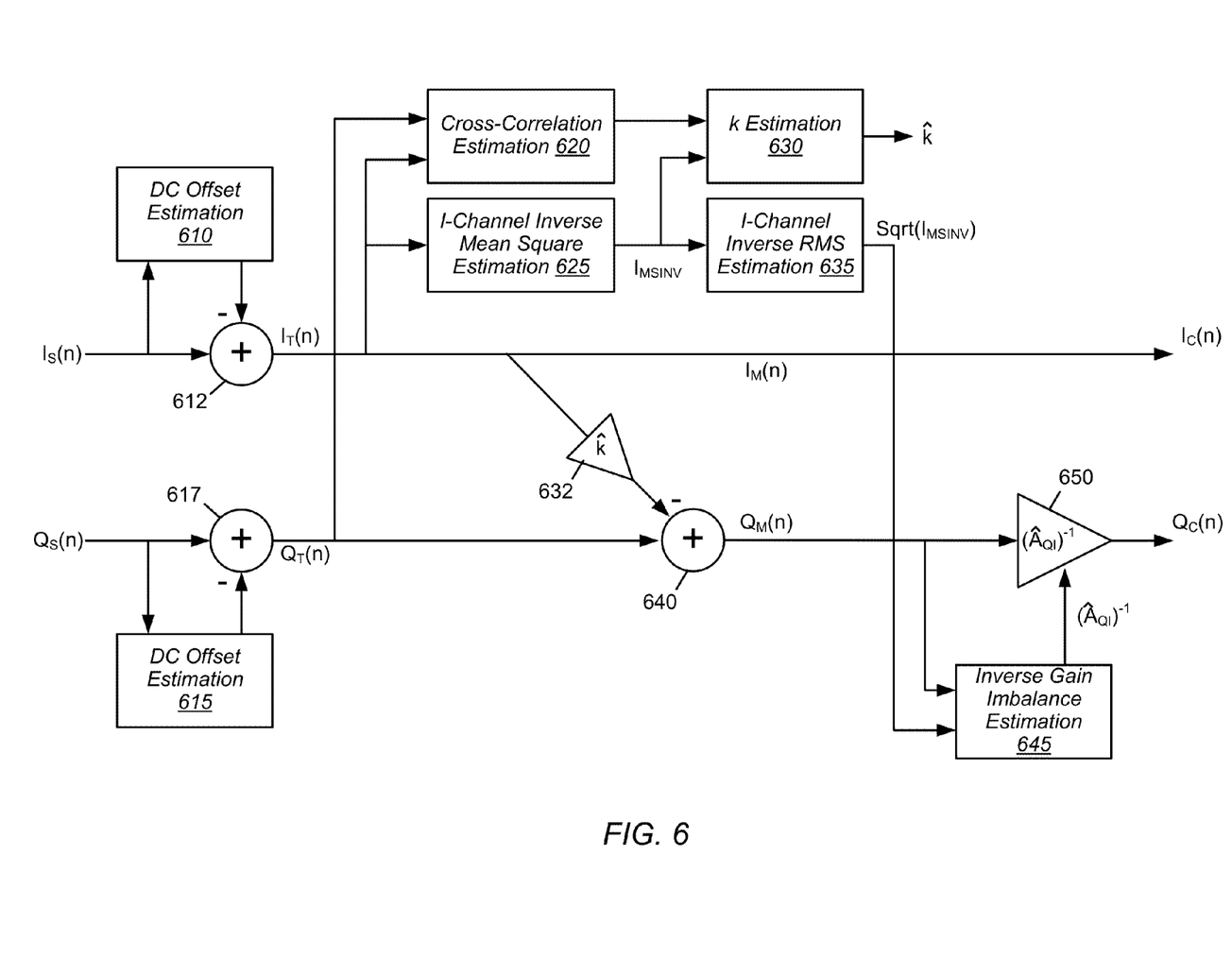
FIG. 6 illustrates one embodiment of a model for the estimation and correction of I/Q impairments introduced by a system comprising a transmitter and a receiver.

FIG. 6 shows a model for the correction of IQ impairments of the transmitter-receiver system, according to one set of embodiments. Unit 610 estimates the DC offset of the I-channel based on the received inphase signal $I_S(n)$, and unit 615 estimates the Q-DC Offset of the Q-channel based on the receive quadrature signal $Q_S(n)$. The I-channel DC offset is subtracted from the inphase signal $I_S(n)$ to obtain an intermediate inphase signal $I_T(n)$. Similarly, the Q-channel DC offset is subtracted from the quadrature signal $Q_S(n)$ to obtain an intermediate quadrature signal $Q_T(n)$.

The unit 620 computes a cross-correlation between the intermediate inphase signal $I_T(n)$ and the intermediate quadrature signal $Q_T(n)$. The resulting cross-correlation value is supplied to the k estimation unit 630. The k estimation unit will be discussed below.

The unit 625 computes an estimate for the inverse of the mean square of the intermediate inphase signal $I_T(n)$. The inverse mean square estimate is provided to unit 635, which computes an inverse RMS value for the intermediate inphase signal $I_T(n)$, e.g., by taking a square root of the inverse mean square estimate.

The unit 630 computes an estimate for the cross-channel gain k based on the cross-correlation value (supplied by unit 620) and the inverse RMS value (supplied by unit 625). The cross-channel gain estimate is provided to unit 632, which multiplies the intermediate inphase signal $I_T(n)$ by the cross-channel gain estimate. The resultant signal $kI_T(n)$ is subtracted from the intermediate quadrature signal $Q_T(n)$ at summing node 640 to obtain modified quadrature signal $Q_M(n)$. In the illustrated embodiment, the inphase signal $I_M(n)$ is the same of the intermediate inphase signal $I_T(n)$. However, in an alternative embodiment, where the cross-channel gain were modeled as a gain from the Q channel to the I channel, the roles of I and Q would be reversed, i.e., the signal $Q_M(n)$ would be the same as $Q_T(n)$, and the signal $I_M(n)$ would conform to the alternative expression: $I_M(n) = I_T(n) - k_{ALT}Q_T(n)$. Thus, the summing node 640 would occur in the I channel instead of the Q channel.

Unit 645 computes an estimate for the reciprocal of the gain imbalance $A_{QI}$ based on the inverse RMS value supplied by unit 635 and the modified quadrature signal $Q_M(n)$. The reciprocal gain imbalance estimate is supplied to scaling unit 650. Scaling unit 640 scales the modified quadrature signal $Q_M(n)$ to obtain corrected quadrature signal $Q_C(n)$. In the illustrated embodiment, the corrected inphase signal $I_C(n)$ is the same as the modified inphase signal $I_M(n)$. However, in an alternative embodiment, where the gain imbalance were modeled by a gain in the I-channel, the scaling unit 650 would occur in the I channel instead of the Q channel; the corrected inphase signal $I_C(n)$ would be a scaled version of the modified inphase signal $I_M(n)$; and the corrected quadrature signal $Q_C(n)$ would be the same as the modified quadrature signal $Q_M(n)$.

In some embodiments, the signal source may be modeled as approaching a complex Gaussian, which is a reasonable assumption in Rayleigh fading. The receiver chain may be modeled as basically a pass-through with IQ cross-correlation, DC offset and gain imbalance distortions. The baseband channel equalizer may be assumed to able to compensate for in-band gain and phase distortion.

The I-channel and Q-channel DC offsets may be estimated through averaging as follows:

$$\bar{I}_S = \frac{1}{N} \sum_{n=1}^{N} I_S(n),$$

$$\bar{Q}_S = \frac{1}{N} \sum_{n=1}^{N} Q_S(n).$$

As an initial operation at the receiver, the estimated DC offsets may be subtracted respectively from the received signal components to obtain modified signal components $$I_T(n) = I_S(n) - \bar{I}_S,$$

$$Q_T(n) = Q_S(n) - \bar{Q}_S.$$

The next operation at the receiver is to compute the cross-correlation between the I and Q components of the modified signal:

$$\tilde{R}_{iq}(N) = \frac{1}{N} \sum_{n=1}^{N} I_T(n) Q_T(n).$$

An estimate for the k-factor is computed by first estimating the inverse mean squared value $I_{MSINV}$, and then multiplying that value by the cross-correlation estimate:

$$I_{MSINV} = \frac{N-1}{\sum_{n=1}^{N} I_T^2(n)},$$

$$\hat{k} = \tilde{R}_{iq}(N) I_{MSINV}.$$

Because the IQ cross-channel distortion impacts the relative signal strengths of the I and Q channels, this distortion may be removed prior to estimation of the received signal strengths of the separate I and Q channels. The cross-channel distortion may be removed using the estimated k-factor, e.g., according to the relation:

$$Q_M(n) = Q_T(n) - \hat{k} I_T(n).$$

The signal strength on the two channels may be measured as follows.

$$\hat{\sigma}_I(N) = \sqrt{\frac{1}{N-1} \sum_{n=1}^{N} I_T^2(n)}$$

$$\hat{\sigma}_Q(N) = \sqrt{\frac{1}{N-1} \sum_{n=1}^{N} Q_M^2(n)}.$$

The signal strength values may be used to compute an estimate for the IQ gain imbalance:

$$\hat{A}_{QI} = \frac{\hat{\sigma}_Q(N)}{\hat{\sigma}_I(N)}.$$

The gain imbalance distortion may be corrected by scaling the modified quadrature signal $Q_M(n)$ based on the gain imbalance estimate, e.g., according to expression:

$$Q_C(n) = Q_M(n) * (1/\hat{A}_{QI}).$$

Figure 7A:
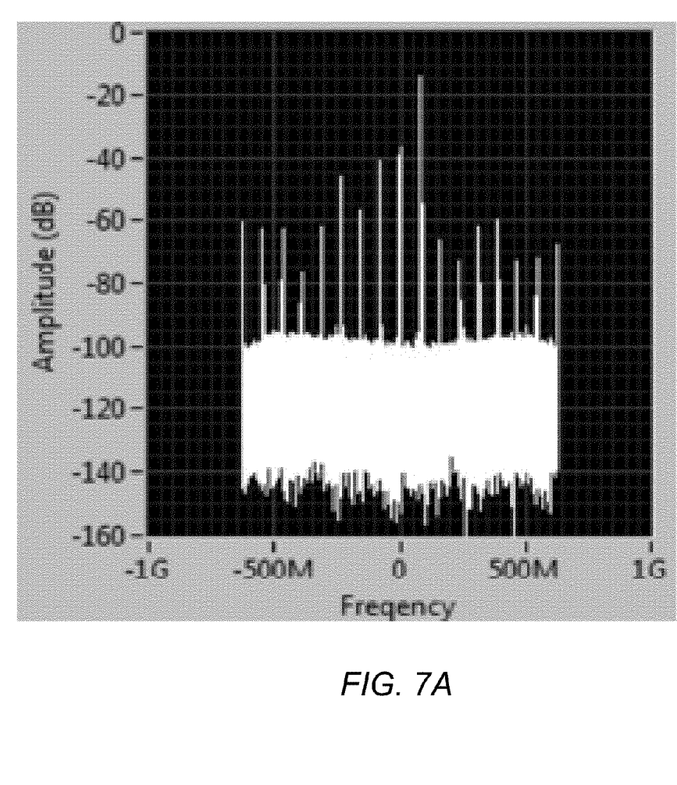
FIG. 7A is a graph of image rejection as function of frequency for a particular 60 GHz RF system.
Figure 7B:
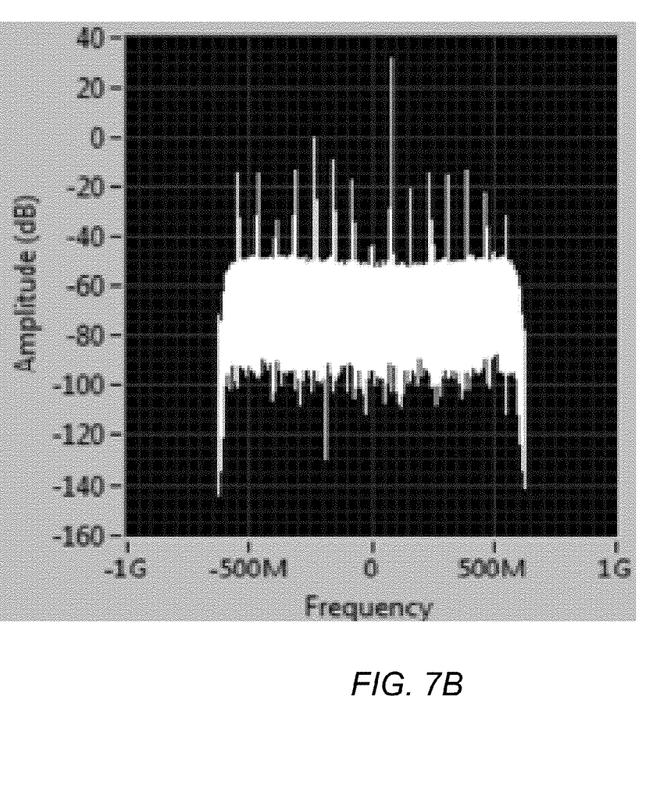
FIG. 7B is a graph of carrier feedthrough for the same 60 GHz RF system, again as a function of frequency.

FIG. 7A illustrates the image rejection resulting from the above-described calibration method for a particular 60 GHz RF system. The image rejection is plotted as a function of frequency with respect to the center frequency. Observe that the image rejection improved by 18 dB. FIG. 7B illustrates the carrier feedthrough for the same 60 GHz RF system, again as a function of frequency relative to the center frequency. Observe that the carrier feedthrough drops by 51 dB. While the results of the above-described calibration method are illustrated for a 60 GHz RF system, it should be understood that the calibration method may be performed for any system involving the transmission of a complex baseband signal from transmitter to receiver through a channel. That system may or may not involve RF transmission. Furthermore, there is nothing special about the value 60 GHz. The above-described calibration method may be performed regardless of the frequency band in which signals are carried through the channel.

Figure 8:
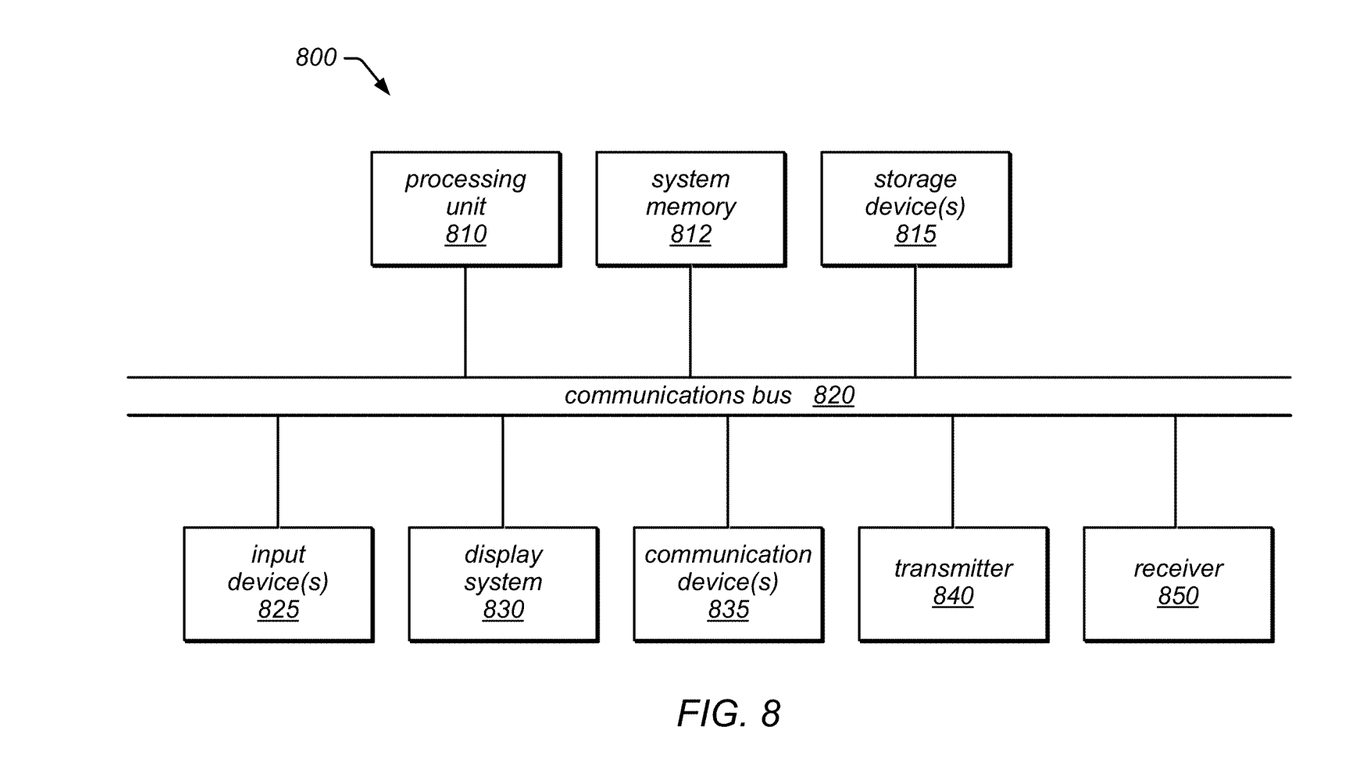
FIG. 8 illustrates one embodiment of a computer system 800 that may be used to perform any of the method embodiments described herein.

FIG. 8 illustrates one embodiment of a computer system 800 that may be used to perform any of the method embodiments described herein, or, any combination of the method embodiments described herein, or any subset of any of the method embodiments described herein, or, any combination of such subsets.

Computer system 800 may include a processing unit 810, a system memory 812, a set 815 of one or more storage devices, a communication bus 820, a set 825 of input devices, and a display system 830.

System memory 812 may include a set of semiconductor devices such as RAM devices (and perhaps also a set of ROM devices).

Storage devices 815 may include any of various storage devices such as one or more memory media and/or memory access devices. For example, storage devices 815 may include devices such as a CD/DVD-ROM drive, a hard disk, a magnetic disk drive, magnetic tape drives, etc.

Processing unit 810 is configured to read and execute program instructions, e.g., program instructions stored in system memory 812 and/or on one or more of the storage devices 815. Processing unit 810 may couple to system memory 812 through communication bus 820 (or through a system of interconnected busses). The program instructions configure the computer system 800 to implement a method, e.g., any of the method embodiments described herein, or, any combination of the method embodiments described herein, or, any subset of any of the method embodiments described herein, or any combination of such subsets.

Processing unit 810 may include one or more processors (e.g., microprocessors).

One or more users may supply input to the computer system 800 through the input devices 825. Input devices 825 may include devices such as a keyboard, a mouse, a touch-sensitive pad, a touch-sensitive screen, a drawing pad, a track ball, a light pen, a data glove, eye orientation and/or head orientation sensors, a microphone (or set of microphones), or any combination thereof.

The display system 830 may include any of a wide variety of display devices representing any of a wide variety of display technologies. For example, the display system may be a computer monitor, a head-mounted display, a projector system, a volumetric display, or a combination thereof. In some embodiments, the display system may include a plurality of display devices. In one embodiment, the display system may include a printer and/or a plotter.

In some embodiments, the computer system 800 may include other devices, e.g., devices such as one or more graphics accelerators, one or more speakers, a sound card, a video camera and a video card.

In some embodiments, computer system 800 may include one or more communication devices 835, e.g., a network interface card for interfacing with a computer network. As another example, the communication device 835 may include a specialized interface for communication via any of a variety of established communication standards or protocols (e.g., USB, Firewire, PCI, PCI Express, PXI, Bluetooth, WiFi, LTE, WiMax, GSM).

The computer system may be configured with a software infrastructure including an operating system, and perhaps also, one or more graphics APIs (such as OpenGL®, Direct3D, Java 3D™). In some embodiments, the software infrastructure may include National Instruments LabVIEW™ software, and/or, LabVIEW™ FPGA.

In some embodiments, the computer system 800 may be configured for coupling to transmitter 840. The transmitter may be configured to transmit a complex baseband signal onto a communication channel. (The transmitter may include RF upconversion and amplification circuitry configured to convert the complex baseband signal into an RF signal, to facilitate transmission through the channel.) The channel may be a wireless channel or a wired channel. The transmitter may operate under the control of the software executing on processor 810 and/or software executing on the transmitter itself.

In some embodiments, the computer system 800 may be configured to interface with a receiver 850. The receiver may be configured to receive the above-described complex baseband signal from the channel. The receiver may include: an RF amplifier, local oscillator circuitry for generating a local carrier signal; down-conversion circuitry for converting a received RF signal into the complex baseband signal; and a pair of analog-to-digital converters (ADCs) for sampling the complex baseband signal. In some embodiments, the receiver may also include circuitry for performing digital processing on the samples of the complex baseband signal. The circuitry may include one or more programmable hardware elements, one or more microprocessors, one or more dedicated digital circuits such as ASICs, or any combination of the foregoing.

Figure 9:
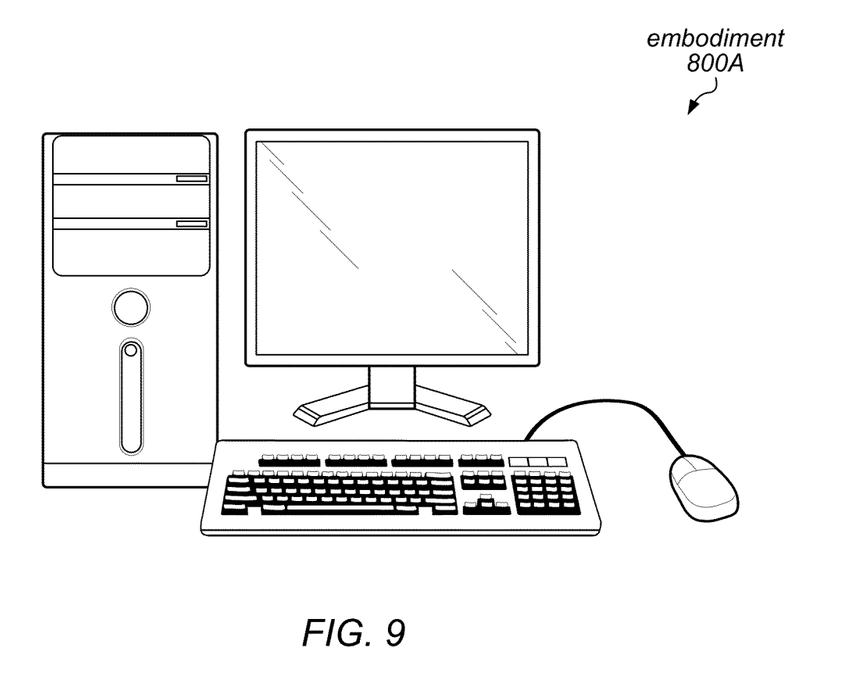
FIG. 9 illustrates an embodiment 800A of computer system 800.

FIG. 9 illustrates an embodiment 800A for computer system 800.

Figure 10:
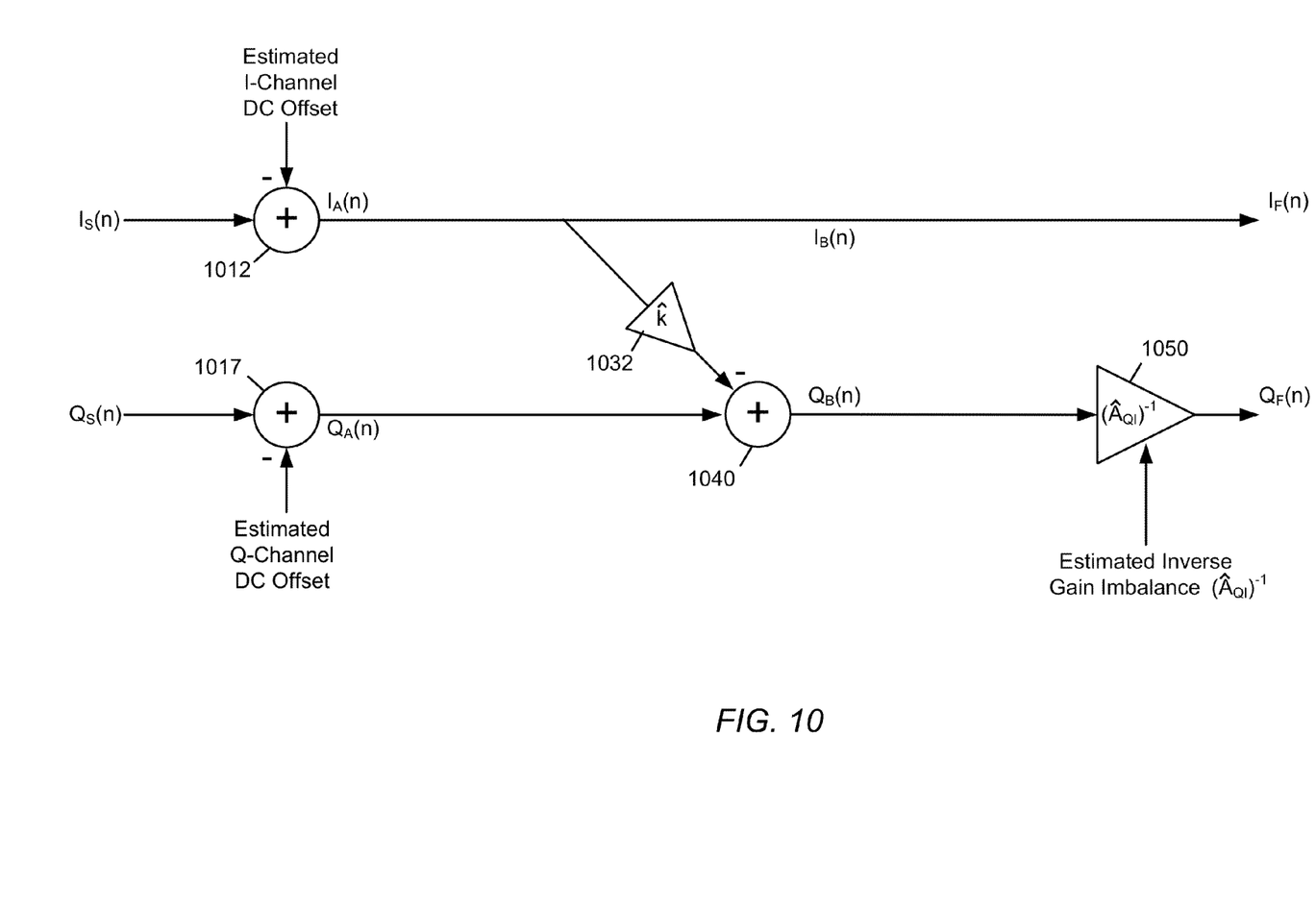
FIG. 10 illustrates one embodiment of circuitry for correcting I/Q distortions within the receiver.

In one set of embodiments, the receiver (e.g., the receiver 120 or the receiver 850) may include correction circuitry for performing IQ distortion correction. The correction circuitry may include summation nodes 1012, 1017 and 1040, and scaling unit 1032 and 1050. The correction circuitry may be situated after the analog-to-digital conversion circuitry of the receiver. The correction circuitry may be implemented by a programmable hardware element, by dedicated digital circuitry (such as an ASIC), by a processor in response to the execution of program instructions, or by any combination of the foregoing.

The summation nodes 1012 may be configured to perform the DC offset corrections:

$$I_A(n)=I_S(n)-\bar{I}_S,$$

$$Q_A(n)=Q_S(n)-\bar{Q}_S,$$

based on DC offset estimates $\bar{I}_S$ and $\bar{I}_S$. The receiver may include parameter memory for storing the values $\bar{I}_S$ and $\bar{I}_S$.

The scaling unit 1032 and the summation node 1040 may be configured to apply the cross-channel distortion correction, e.g., according to the expression:

$$Q_B(n)=Q_A(n)-\hat{k}I_A(n).$$

The scaling unit 1032 performs the scalar multiplication, and the summation node 1040 performs the subtraction. The cross-channel gain estimate $\hat{k}$ may be stored in the parameter memory. The inphase signal $I_B(n)$ may be the same as the signal $I_A(n)$. (Thus, no computation is necessary to obtain the signal $I_B(n)$.)

In an alternative embodiment, where the cross-channel distortion is modeled by a gain from the Q channel to the I channel, the roles of I and Q would be reversed, i.e., the summation node 1040 would occur in the I channel instead of the Q channel. Thus, the signal $I_B(n)$ would be computed according to the expression $$I_B(n)=I_A(n)-\hat{k}Q_A(n),$$

and the signal $Q_B(n)$ would be the same as the signal $Q_A(n)$.

The scaling unit 1050 may be configured to apply the gain imbalance distortion correction, e.g., according to the expression:

$$Q_F(n)=Q_B(n)*(1/\hat{A}_{QI}).$$

The estimated inverse gain imbalance $A_{QI}^{-1}$ may be stored in the parameter memory. The signal $I_F(n)$ may be the same as the signal $I_B(n)$.

In an alternative embodiment, where the gain imbalance distortion $A_{QI}$ is modeled by a gain in the I channel, the scaling unit 1050 would be situated in the I channel instead of the Q channel. Thus, the signal $I_F(n)$ would be computed according to the expression:

$$I_F(n)=I_B(n)*(1/\hat{A}_{QI}).$$

The receiver may perform baseband processing such as channel equalization and demodulation on the corrected complex signal $<I_F(n),Q_F(n)>$. Demodulation is the operation of recovering an (analog or digital) information signal from the corrected complex signal. The information signal may be presented to a user via an output device, e.g., a speaker, a display device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for blind estimation of receiver correction parameters, the method comprising:
   (a) receiving complex samples of a complex baseband signal from a receiver;
   (b) computing a value of cross-correlation between a I component of the complex samples and a Q component of the complex samples, wherein the cross-correlation is a time-domain cross correlation between the I component and the Q component;
   (c) computing a mean square value $I_{MS}$ of the I component of the complex samples, and computing a mean square value $Q_{MS}$ of the Q component of the complex samples;
   (d) computing an estimate for a cross-channel gain k based on the cross-correlation value and one or both of the mean square values $I_{MS}$ and $Q_{MS}$;
   (e) applying a cross-channel gain correction to the complex samples based on the estimate for the cross-channel gain k, in order to obtain modified complex samples;
   (f) computing an estimate of a gain imbalance based on the mean square values $I_{MS}$ and $Q_{MS}$, wherein the gain imbalance estimate is useable to correct an I/Q gain imbalance present in the complex samples;
   computing an estimate of an I-channel DC offset based on the I component of the complex samples;
   computing an estimate of a Q-channel DC offset based on the Q component of the complex samples; and
   applying DC offset corrections to the complex samples of the complex baseband signal based on the estimate of the I-channel DC offset and the estimate of the Q-channel DC offset.

2. The method of claim 1, wherein the receiver generates the complex baseband signal in response to receiving a signal transmission from a transmitter.

3. The method of claim 2, wherein the signal transmission from the transmitter is a transmission of one or more of the following:
   a modulated waveform;
   a tone;
   a series of tones;
   a noise signal;
   an interfering signal.

4. The method of claim 2, wherein the cross-channel gain k represents cross-channel distortions in the transmitter and receiver, wherein the gain imbalance represents gain imbalance distortions in the transmitter and receiver.

5. The method of claim 1, further comprising:
   applying an I/Q gain imbalance correction to the modified complex samples based on the gain imbalance estimate to obtain corrected complex samples for the complex baseband signal.

6. The method of claim 5, further comprising:
   displaying the corrected complex samples.

7. The method of claim 1, wherein the receiver generates the complex baseband signal in response to receiving a signal transmission from a transmitter, wherein the I-channel DC offset represents DC offset distortions in the I channel of the transmitter and the I channel of the receiver, wherein the Q-channel DC offset represents DC offset distortions in the Q channel of the transmitter and the Q channel of the receiver.

8. The method of claim 1, wherein said applying the DC offset corrections to the complex samples is performed prior to performing (b) through (f).

9. The method of claim 1, wherein (a) through (f) are performed by a computer external to the receiver, wherein the estimate for the cross-channel gain k and the gain imbalance value are stored in a memory of the computer.

10. The method of claim 9, further comprising:
    transferring the estimate of the cross-channel gain k and the gain imbalance estimate from the memory to the receiver, enabling the receiver to apply cross-channel gain correction and gain imbalance correction in an online operational mode of the receiver.

11. The method of claim 10, wherein the receiver includes a programmable hardware element configured to apply said cross-channel gain correction and said gain imbalance correction based respectively on the estimate of the cross-channel gain and the gain imbalance estimate.

12. The method of claim 1, further comprising:
supplying complex samples of a complex input signal to a transmitter; and
directing the transmitter to perform the signal transmission based on the complex samples of the complex input signal.

13. The method of claim 12, wherein the complex input signal is a digitally-modulated baseband signal.

14. The method of claim 1, wherein (a) through (f) are performed by the receiver.

15. The method of claim 1, wherein the receiver generates the complex baseband signal in response to receiving a signal transmission from a transmitter, wherein the transmitter is a base station of a wireless communication network, wherein the signal transmission from the transmitter is a communication signal transmitted by the base station.

16. The method of claim 1, wherein the receiver is incorporated in a wireless communication device.

17. A non-transitory computer-readable memory medium storing program instructions, wherein the program instructions, when executed by a processor, cause the processor to implement:
(a) receiving complex samples of a complex baseband signal from a receiver;
(b) computing a value of cross-correlation between a I component of the complex samples and a Q component of the complex samples, wherein the cross-correlation is a time-domain cross correlation between the I component and the Q component;
(c) computing a mean square value $I_{MS}$ of the I component of the complex samples, and computing a mean square value $Q_{MS}$ of the Q component of the complex samples;
(d) computing an estimate for a cross-channel gain k based on the cross-correlation value and one or both of the mean square values $I_{MS}$ and $Q_{MS}$;
(e) applying a cross-channel gain correction to the complex samples based on the estimate for the cross-channel gain k, in order to obtain modified complex samples;
(f) computing an estimate of a gain imbalance based on the mean square values $I_{MS}$ and $Q_{MS}$, wherein the gain imbalance estimate is useable to correct an I/Q gain imbalance present in the complex samples;
computing an estimate of an I-channel DC offset based on the I component of the complex samples;
computing an estimate of a Q-channel DC offset based on the Q component of the complex samples; and
applying DC offset corrections to the complex samples of the complex baseband signal based on the estimate of the I-channel DC offset and the estimate of the Q-channel DC offset.

18. The memory medium of claim 17, wherein the program instructions, when executed by the processor, further cause the processor to implement:
applying an I/Q gain imbalance correction to the modified complex samples based on the gain imbalance estimate to obtain corrected complex samples for the complex baseband signal.

19. A system comprising:
a processor; and
a memory storing program instructions, wherein the program instructions, when executed by the processor, cause the processor to:
(a) receiving complex samples of a complex baseband signal from a receiver;
(b) computing a value of cross-correlation between a I component of the complex samples and a Q component of the complex samples, wherein the cross-correlation is a time-domain cross correlation between the I component and the Q component;
(c) computing a mean square value $I_{MS}$ of the I component of the complex samples, and computing a mean square value $Q_{MS}$ of the Q component of the complex samples;
(d) computing an estimate for a cross-channel gain k based on the cross-correlation value and one or both of the mean square values $I_{MS}$ and $Q_{MS}$;
(e) applying a cross-channel gain correction to the complex samples based on the estimate for the cross-channel gain k, in order to obtain modified complex samples;
(f) computing an estimate of a gain imbalance based on the mean square values $I_{MS}$ and $Q_{MS}$, wherein the gain imbalance estimate is useable to correct an I/Q gain imbalance present in the complex samples;
computing an estimate of an I-channel DC offset based on the I component of the complex samples;
computing an estimate of a Q-channel DC offset based on the Q component of the complex samples; and
applying DC offset corrections to the complex samples of the complex baseband signal based on the estimate of the I-channel DC offset and the estimate of the Q-channel DC offset.

* * * * *